United States Patent
Kim et al.

(10) Patent No.: US 9,740,677 B2
(45) Date of Patent: *Aug. 22, 2017

(54) METHODS AND SYSTEMS FOR ANALYZING COMMUNICATION SITUATION BASED ON DIALOGUE ACT INFORMATION

(71) Applicant: NCsoft Corporation, Seoul (KR)

(72) Inventors: Taek Jin Kim, Seongnam (KR); Jay June Lee, Seoul (KR); Jungsun Jang, Seoul (KR); Sehee Chung, Yongin (KR); Kyeong Jong Lee, Yongin (KR); Yeonsoo Lee, Seoul (KR)

(73) Assignee: NCsoft Corporation, Seoul (KR)

( * ) Notice: Subject to any disclaimer, the term of this patent is extended or adjusted under 35 U.S.C. 154(b) by 66 days.

This patent is subject to a terminal disclaimer.

(21) Appl. No.: 14/797,165

(22) Filed: Jul. 12, 2015

(65) Prior Publication Data
US 2016/0210962 A1 Jul. 21, 2016

(30) Foreign Application Priority Data
Jan. 19, 2015 (KR) ........................ 10-2015-0008724

(51) Int. Cl.
*G06F 17/27* (2006.01)

(52) U.S. Cl.
CPC ............ *G06F 17/27* (2013.01); *G06F 17/276* (2013.01); *G06F 17/2785* (2013.01)

(58) Field of Classification Search
CPC ......... G10L 17/26; G10L 15/18; G10L 15/22; G10L 15/00; G10L 15/08; G10L 15/1807;

(Continued)

(56) References Cited

U.S. PATENT DOCUMENTS

| 6,910,186 B2* | 6/2005 | Kim | ........................ G06Q 30/02 715/706 |
| 9,043,196 B1* | 5/2015 | Leydon | ............... G06F 3/04842 704/4 |

(Continued)

FOREIGN PATENT DOCUMENTS

| KR | 10-2011-0026218 A | 3/2011 |
| KR | 10-2014-0105841 A | 9/2014 |

OTHER PUBLICATIONS

Gumwon Hong et al., "A Korean Mobile Conversational Agent System," Korea Computer Science Conference, vol. 13, Book 6, 2008.

(Continued)

*Primary Examiner* — Abdelali Serrou
(74) *Attorney, Agent, or Firm* — Patent Office of Dr. Chung Park

(57) ABSTRACT

Provided is a method of recommending a sticker through a dialog act analysis. The method includes: by a server, performing a surface analysis on the last utterance between the first user terminal and the second user the terminal; performing a dialog act analysis on the last utterance using a result of the surface analysis; extracting a dialog context factor including a surface analysis result and a dialog act analysis result on a certain number of continuous utterances including the last utterance between the first user terminal and the second user terminal; selecting a sticker to be recommended to the first user using the dialog context factor; and providing the selected sticker for the first user terminal.

4 Claims, 19 Drawing Sheets

(58) Field of Classification Search
CPC ............... G10L 15/1822; G10L 15/222; G10L 2015/227; G10L 25/48; G06F 17/279; G06F 17/27; G06F 17/28; G06F 17/3005; G06F 3/04842; G06F 17/26; G06F 17/276; G06F 17/21; G06F 17/274; G06F 17/2785; G06F 17/2881; G06F 3/0481; G06F 3/0484; G06F 3/0486

See application file for complete search history.

(56) References Cited

U.S. PATENT DOCUMENTS

| | | | | |
|---|---|---|---|---|
| 9,329,677 | B2* | 5/2016 | Chien | G06F 3/011 |
| 2009/0144366 | A1* | 6/2009 | Lyle | G06Q 10/107 |
| | | | | 709/204 |
| 2011/0131042 | A1* | 6/2011 | Nagatomo | G10L 15/18 |
| | | | | 704/240 |
| 2011/0294525 | A1* | 12/2011 | Jonsson | |
| 2012/0059787 | A1* | 3/2012 | Brown | G06F 17/241 |
| | | | | 706/52 |
| 2013/0151508 | A1* | 6/2013 | Kurabayashi | G06F 17/2223 |
| | | | | 707/723 |
| 2014/0052794 | A1* | 2/2014 | Tucker | G06Q 50/01 |
| | | | | 709/206 |
| 2014/0067375 | A1* | 3/2014 | Wooters | G06F 17/279 |
| | | | | 704/9 |
| 2014/0181229 | A1* | 6/2014 | Tucker | H04L 12/1827 |
| | | | | 709/206 |
| 2014/0298364 | A1* | 10/2014 | Stepanov | H04N 21/25 |
| | | | | 725/10 |
| 2015/0178388 | A1* | 6/2015 | Winnemoeller | G06F 17/30864 |
| | | | | 707/722 |
| 2015/0193889 | A1* | 7/2015 | Garg | G06Q 30/0251 |
| | | | | 705/14.49 |
| 2015/0281157 | A1* | 10/2015 | Pearce | H04L 51/18 |
| | | | | 709/206 |
| 2016/0127280 | A1* | 5/2016 | Nair | H04L 51/04 |
| | | | | 709/206 |

OTHER PUBLICATIONS

Kim, Jun Hyun et al. "Automated Emotion Recommendation Module Based on Bigram-Signature Using Text Mining," Korean Computer Conference, pp. 1632-1634, 2014.

"Analysis of speech acts for Korean dialog sentences," Hyunjung Lee et al., KIST, IP 143.248.118.12.

* cited by examiner

FIG. 14

SURFACE FACTOR

| feature | feature EXPRESSION EXAMPLE |
|---|---|
| WORD(MORPHEME) n-gram | TriMorph=보_겠_습니다 |
| PARTS OF SPEECH n-gram | PosTrigram=VX_EP_EF |
| PAIR OF WORD-PART OF SPEECH | MorphPos=습니다_EF |
| LAST WORD | LastEojeol=보겠습니다! |
| LAST VERB | LastVerb=만들 |
| LAST ADVERB | LastAdverb=어서 |
| LAST AUXILIARY PREDICATE | LastVerb=보 |
| LAST ENDING | LastEomi=습니다 |
| SUBJECT | Subject=나 |
| LENGTH | Length=M |
| FORMAL MORPHEME SEQUENCE | FunMorphSeq=이_어_이_아_보_겠_습니다 |
| FORMAL MORPHEME SET | FunMorphSet=겠_보_습니다_아_어_이 |
| FORMAL PART OF SPEECH SEQUENCE | FunPosSeq=JKS_EC_VX_EC_VX_EP_EF |
| FORMAL PART OF SPEECH SET | FunPosSet=EC_EF_EP_JKS_VX |
| ABUSIVE LANGUAGE, EMOTICON | ExistExp=JOY, NumExp=JOY:1, ExpWord=JOY_^_^ |

FIG. 15

DIALOGUE CONTEXT FACTOR

| feature group | feature EXPRESSION EXAMPLE |
|---|---|
| FEATURE: SURFACE FEATURE OF LAST UTTERANCE OF USER | PrevMy XXXXXX |
| FEATURE: SURFACE FEATURE OF UTTERANCE BEFORE LAST OF USER | BeforeLastMy XXXXXX |
| FEATURE: SURFACE FEATURE OF LAST UTTERANCE OF OTHER PARTY | PrevOpp XXXXXX |
| FEATURE: SURFACE FEATURE OF UTTERANCE BEFORE LAST OF OTHER PARTY | BeforeLastOpp XXXXXX |
| DIALOGUE ACT HISTORY - order 1 | DialActUnigram=Opp_AcceptRequest |
| DIALOGUE ACT HISTORY - order 2 | DialActBigram=My_Request_Opp_AcceptRequest |
| DIALOGUE ACT HISTORY - order 3 | DialActTrigram=Opp_Disconfirm_My_Request_Opp_AcceptRequest |
| EMOTION HISTORY - order 1 | EmotionUnigram=Opp_None |
| EMOTION HISTORY - order 2 | EmotionBigram=My_None_Opp_None |
| EMOTION HISTORY - order 3 | EmotionTrigram=Opp_None_My_None_Opp_None |

METHODS AND SYSTEMS FOR ANALYZING COMMUNICATION SITUATION BASED ON DIALOGUE ACT INFORMATION

CROSS-REFERENCE TO RELATED APPLICATIONS

This U.S. non-provisional patent application claims priority under 35 U.S.C. §119 of Korean Patent Application No. 10-2015-0008724, filed on Jan. 19, 2015, the entire contents of which are hereby incorporated by reference.

BACKGROUND OF THE INVENTION

The present invention disclosed herein relates to a method of recommending stickers during a dialogue through a social network service or an instant messenger, and more particularly, to a method of recommending stickers that are appropriate for a context through a dialogue act analysis.

Emoticons are being used to express the emotional state of a user during a dialogue through a social network service or an instant messenger.

In the past, emoticons (e.g., OTL, TT, ^^, etc.) written with texts was added to the end of the dialogue, but in recent years, emoticons of graphic image types are being widely used.

While inputting dialogue contents, a user opens an emoticon selection window and then selects and inputs an appropriate emoticon. In order to more conveniently perform the foregoing process, a technology of automatically converting and expressing a text inputted by a user into an emoticon has been also developed.

FIG. 1 is a view illustrating an emoticon displayed on a well-known personal computer messenger (NateOn).

In the well-known messenger shown in FIG. 1, when a specific keyword is inputted, the corresponding text is automatically converted into an emoticon corresponding to the specific keyword. In FIG. 1, when a user inputs a word "present", it can be seen that the word "present" is automatically converted into the emotion corresponding to the present.

However, when a specific keyword is simply inputted, this related art technology merely expresses an emoticon matched with the specific keyword in advance. Accordingly, in many cases, emoticons are expressed in regardless of dialogue contents or contexts and emotional state, even in an inappropriate manner in the light of the dialogue situation.

Accordingly, there has been developed a technology of recommending a more appropriate emoticon in consideration of a situation such as the emotional state of a user, surpassing the emoticon conversion technology through simply keyword matching.

Korean Patent Application Publication No. 10-2011-0026218 discloses "apparatus and method for inputting text message and its program stored in recording medium", which extract words indicating the emotional state from dialogue contents that are inputted, and select an emoticon matching with the emotional state using the extracted words.

However, this technology is also merely to select emoticons matching with the corresponding keywords from emoticons by analyzing inputted texts when keywords representing the emotional state such as happiness and sadness show. For example, in case where words indicating the emotional state of a user are ironically used unlike the dictionary definition of the word, there is a limitation in that unexpected emoticons are still recommended.

Meanwhile, the Korean Sound Conference Paper, Vol. 28, No. 1, PP 61-69 (2009), entitled "A Method for Measuring Inter-Utterance Similarity Considering Various Linguistic Features", discloses a technology of measuring similarity in consideration of not only simple semantic analysis of utterance, but also morphological features and semantic features (e.g., sentence pattern, tense and affirmation/negation).

The paper which is an existing research of the applicant of the present invention can be utilized to recommend appropriate emoticons through semantic analysis about utterance, but there is a limitation in that the context according to the flow of dialogue cannot be understood. Hereinafter, the term "utterance" refers to at least one of text and image.

PRIOR ART DOCUMENT

Patent Document

Document 1. Korean Patent Application Publication No. 10-2011-0026218 entitled "Apparatus and method for inputting text message and its program stored in recording medium"

Document 2. Korean Patent No. 10-0751396 entitled "System and method for auto conversion emoticon of SMS in mobile terminal"

Non-Patent Document

Document 3. Jun-Hyuk Kim, Young-Woong Park, Seul-Bi Ha, and Yong-Seok Choi, "Automated Emotion Recommendation Module Based on Bigram-Signature Using Text Mining", Korean Computer Conference, PP 1632-1634, 2014.

Document 4. Yeon-Su Lee, Joong-Hui Shin, Gum-Won Hong, Young-In Song, Do-Gil Lee, and Hae-Chang Rim, "A Method for Measuring Inter-Utterance Similarity Considering Various Linguistic Features", Korean Sound Conference, Vol. 28, No. 1, PP 61-69 (2009).

Document 5. GumWon Hong, Yeon-Soo Lee, Min-Jeong Kim, Seung-Wook Lee, Joo-Young Lee, and Hae-Chang Rim, "A Korean Mobile Conversational Agent System", Korea Computer Science Conference, Vol. 13, Book 6, 2008.

SUMMARY OF THE INVENTION

The present invention provides a method of recommending a sticker so as to allow long-distance users to use the sticker by including the sticker in an utterance in a messenger or a social network service in which long-distance users exchange dialogues with each other, and more specifically, a method of understanding a context by the unit of dialogue in which a plurality of utterances continue, not by the unit of utterance, and recommending an appropriate sticker in accordance with the context.

The present invention also provides a method of recommending a more accurate and appropriate sticker by understanding the utterance intention from various expressions regardless of whether or not a specific keyword is included, through natural language analysis of abstracted level past the level of simple keyword matching.

The present invention also provides a method of recommending an appropriate sticker in accordance with a context, by classifying dialogue acts using a dialogue act classification system and generating dialogue situation information using dialogue act category and surface analysis results on a plurality of utterances that sequentially continue.

The present invention also provides a method of enabling recommendation and use of various stickers in order to represent the utterance intention regardless of the expression of emotional state by using dialogue act information for recommendation of sticker, whereas emoticons are mainly used to express the emotional state in a related art.

Embodiments of the present invention methods of recommending a sticker through a dialogue act analysis, include: by a server connected to a first user terminal and a second user terminal through a network, accumulating utterance data through dialogue act and emotion tag attachment to a corpus; performing a surface analysis on the last utterance between the first user terminal and the second user the terminal; performing a dialogue act analysis on the last utterance using a result of the surface analysis; extracting a dialogue context factor including a surface analysis result and a dialogue act analysis result on a certain number of continuous utterances including the last utterance between the first user terminal and the second user terminal; selecting a sticker to be recommended to the first user using the dialogue context factor; and providing the selected sticker for the first user terminal.

In some embodiments, the accumulating of the utterance data may include: generating dialogue situation information from the corpus to which stickers are attached and generating a combination of dialogue situation information-sticker; indexing and storing a flow of dialogue act information between continuous utterances; and indexing and storing a combination of sticker and input utterance into a sticker identity (ID).

In other embodiments, the performing of the surface analysis may include: correcting a colloquial style of sentences of an input utterance; analyzing morphemes of the corrected utterance and attaching parts of speech to the corrected utterance; and extracting keywords based on the analyzed morphemes and the attached parts of speech.

In still other embodiments, the performing of the dialogue act analysis may include determining which dialogue act category the surface-analyzed utterance belongs to in an already-established dialogue act classification system.

In even other embodiments, the dialogue context factors may include: dialogue act category and surface factors of the last utterance; and dialogue act category and surface factor of each of a certain number of utterances between the first user and the second user immediately before the last utterance, and the selecting of the sticker includes selecting stickers associated with utterance data matching with changes of dialogue act categories included in the dialogue context factor and matching with the keywords of the last utterance among the utterance data that are already accumulated.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 14 is a view illustrating surface factors;

FIG. 15 is a view illustrating dialogue context factors;

DETAILED DESCRIPTION OF PREFERRED EMBODIMENTS

Figure 1:
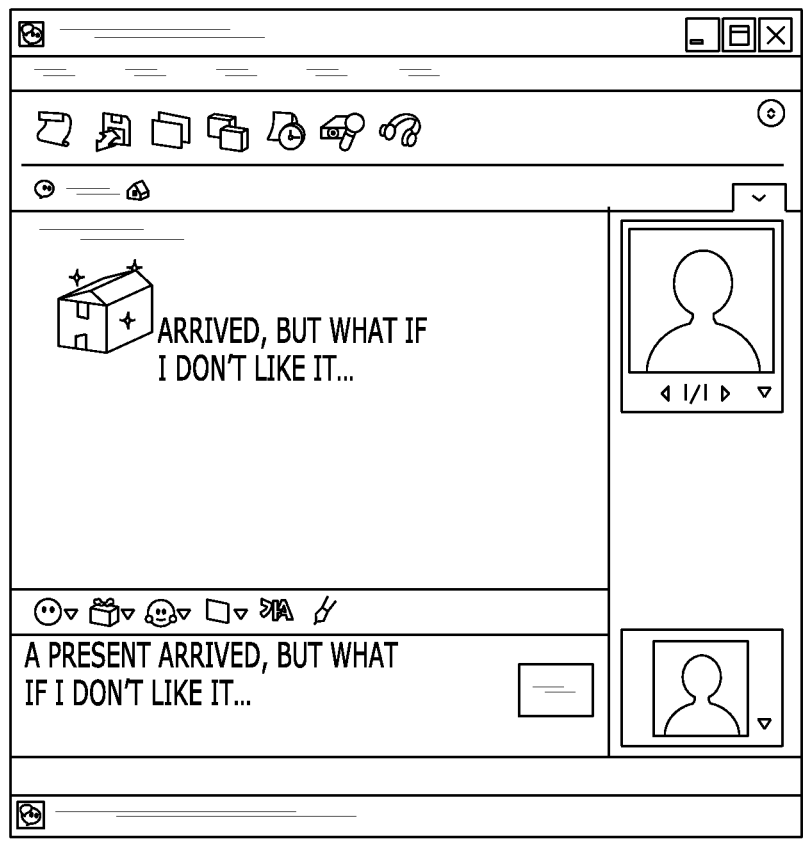
FIG. 1 is a view illustrating a typical automatic emoticon conversion technology.

Hereinafter, exemplary embodiments of the present invention will be described in detail with reference to the accompanying drawings. In order to clarify the present invention, a description irrelevant to the constitution of the present invention will be omitted, and in the drawings, like reference numerals refer to like elements throughout.

Since the terms "including", "comprising", and "having" can be construed as encompassing corresponding components unless specially described as opposite, it should be understood that they do not exclude other components but encompass other components. Unless defined otherwise, all technical and scientific terms have the same meanings as commonly understood by those skilled in the art to which the present invention belongs.

In the detailed description of the invention and claims, components named as "~unit", "~part", "~module", and "~block" mean units that process at least one function or operation, and each of which can be implemented by software, hardware, or a combination thereof.

Hereinafter, a sticker denotes a graphic image used in a dialogue on a messenger or social network service. The sticker can be used interchangeably with an emoticon.

Hereinafter, an attached sticker denotes a sticker that accompanies a dialogue sentence inputted by a user and is attached to the inputted sentence.

Hereinafter, a response sticker denotes a sticker used to respond to a sticker used by the other party in the last dialogue or the last dialogue contents inputted by the other party.

In this embodiment, the attached sticker may be a sticker recommended for a dialogue sentence inputted by the other party, and the response sticker may be a sticker recommended for a user (not the other party) in order to respond to a sticker used by the other party or the last dialogue sentence inputted by the other party.

Hereinafter, the attachment of a sticker denotes expressing the graphic image of the corresponding sticker at the front or rear of a dialog box or inputted dialogue contents or in the middle of the dialog box or inputted dialogue contents.

Hereinafter, an utterance denotes a basic unit of dialogue inputted by a user on a messenger or a social network service. Generally, the utterance may be performed by inputting dialogue contents in a form of text into a dialogue input window and then pushing a button "Send".

Hereinafter, a dialogue situation denotes a state flow of dialogue which emerges through the intention of utterance, emotion, and keyword analysis.

Hereinafter, a speech act denotes the intention of utterance.

Hereinafter, dialogue situation information includes dialogue act information (information on dialogue act category) acquired from dialogue act analysis, emotion information analysis and keyword extraction results on a series of continuous utterances, emotion information (information on emotion category and emotion degree), and keywords.

Hereinafter, utterance data denotes data accumulated through an analysis on a dialogue act attachment corpus and an emotion attachment corpus. The utterance data may include a dialogue act category change of a plurality of continuous utterances, emotion types, and emotion degree changes. Each utterance included in the utterance data may be analyzed so as to have dialogue act information, emotion information and keywords, and may also be stored in a form of dialogue situation information. Meanwhile, the utterance data may further include information about whether each utterance corresponds to a response or starts a theme.

Hereinafter, surface factors may be defined in order to describe formal features of an utterance, and may be obtained by correcting a colloquial style of sentence in regard to a certain utterance, analyzing morphemes, and attaching parts of speech.

Hereinafter, an emotion classification factor may be defined to describe the type and degree of emotion of an utterance, and may be obtained from the dialogue act analysis.

Hereinafter, a dialogue context factor may be defined to describe the context of a plurality of continuous utterances, and may include a surface factor in regard to the last several utterances of a user, a surface factor in regard to the last several utterances of the other dialogue party, and a history of dialogue act information and emotion information.

Figure 2:
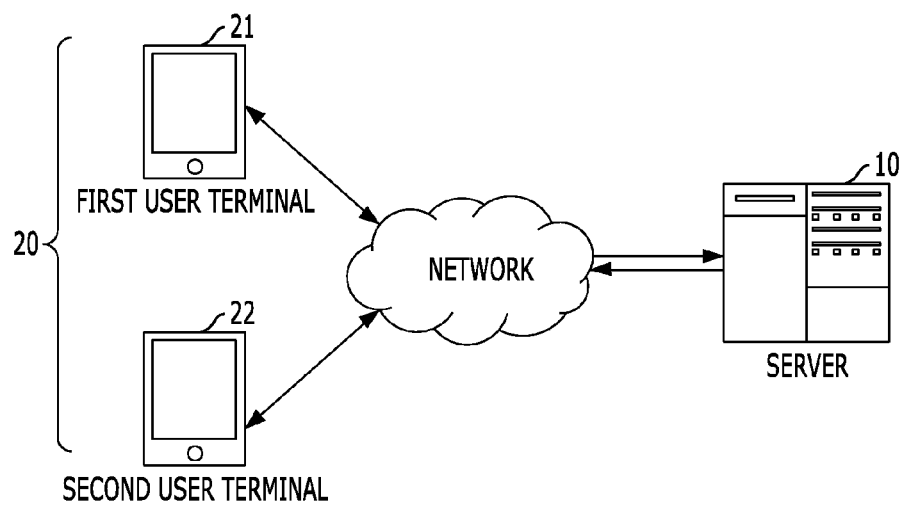
FIG. 2 is a view illustrating a relationship of a server and user terminals.

FIG. 2 is a view illustrating a relationship of a user terminal 20 and a server 10.

The user terminal 20 may be connected to the server 10 through a network, and may correspond to a unit for inputting dialogue contents or expressing an utterance inputted from the other party.

A user may exchange a visual form of messages including texts and images with other users via the server 10 using the user terminal 20.

Examples of the user terminal 20 may include smart phones and personal computers as the unit for performing the foregoing functions. In addition, units that can be connected to the network (e.g., Internet) and enable a visual type of communication for a user should be construed as being included in the user terminal 20.

Hereinafter, a first user may be in dialogue with the other party by exchanging messages with the other party, and a first user terminal 21 may correspond to a unit that enables the first user to perform the visual type of communication.

A second user may be the other part in dialogue with the first user, and a user terminal 22 may be a terminal used by the second user for dialogue.

The server 10 may relay messages between the first user and the second user, and may recommend attached stickers and response stickers to first user.

Hereinafter, it will be described that the server 10 recommends stickers to the first user, but this distinguishment between the first user and the second user is merely for better understanding as a matter of convenience. Accordingly, it is natural that the server 10 can recommend stickers to both users.

In FIG. 2, although only a single server is shown, a server group including a plurality of servers divided in accordance with functions thereof may be provided.

For example, the server 10 may also include a messenger server for relaying a dialogue between the first user terminal 21 and the second user terminal 22, a sticker recommendation server for analyzing a dialogue and recommending stickers, and a server for providing a social network service.

Also, the server 10 may be connected to an external social network service server in order to provide a sticker recommendation result for the user terminal 20 via the external server.

The present invention may be implemented by the sticker recommendation method executed in the server 10, or may be implemented in a form of the server 10 for executing the sticker recommendation method. Also, the present invention may be implemented in a form of computer program executed in the server 10.

The server 10 may select and recommend appropriate stickers during the dialogue of users through the following process.

First, the server 10 may collect dialogue contents from the first user terminal 21 and the second user terminal 20, and may analyze the dialogue situation by segmenting and analyzing an utterance.

Meanwhile, the server 10 may select an appropriate sticker candidate group by retrieving similar dialogue situations from utterance data which are already collected and analyzed using the established dialogue situation classification system and dialogue situation information, and may determine the ranking of stickers based on the situation and preference and finally recommend stickers to a user.

That is, unlike a related art in which one-to-one matching (recommending identical sticker in regard to identical keyword) is performed through simple comparison of keywords, even though identical keyword is checked from the parsing of dialogue contents, different stickers may be recommended in accordance with the dialogue situation, relation with the other party, or personal preference of a user.

Figure 3:
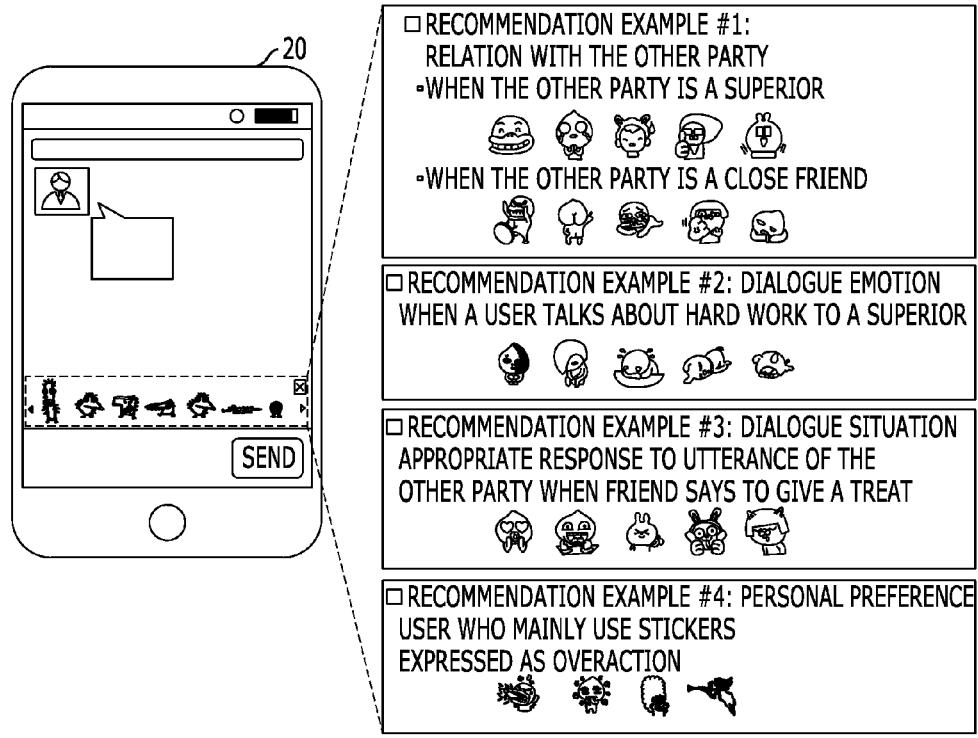
FIG. 3 is a view illustrating examples of recommending stickers in consideration of relation with the other dialogue party, dialogue emotion, dialogue situation, and personal preference.

FIG. 3 is a view illustrating examples of recommending, by the server 10, different sticker groups in accordance with the relation with the other party, dialogue emotion, dialogue situation, and personal preference in spite of identical dialogue contents.

In Example #1 of FIG. 3, when the other dialogue party is a superior or a close friend, it can be seen that different sticker groups are recommended.

In case of a superior, stickers giving an excessively unceremonious feeling may be excluded, and stickers appropriate for dialogue with a superior may be mainly recommended.

On the other hand, when the other party is a close friend, stickers that can be used conveniently instead of sticking to formality may be mainly recommended.

In Example #2 of FIG. 3, an appropriate sticker group may be recommended in accordance with the emotional state of a user.

When a user talks about hard and sad company works, the server 10 may catch the emotional state of a user, and may recommend a sticker group matching with the emotional state as shown in Example #2 of FIG. 3.

In Example #3 of FIG. 3, an appropriate sticker group may be recommended in accordance with the dialogue situation.

When the other dialogue party says to give a treat at the last inputted dialogue contents, stickers appropriate for the talk of the other dialogue party may be recommended as the dialogue contents of a user.

In Example #4 of FIG. 3, the ranking of selected sticker groups may be again determined and then recommended in accordance with the personal preference.

From the analysis of metadata of stickers that are much used at ordinary times by a user, if a user mainly use stickers expressed as overaction, then the server 10 may correct and provide a sticker group for the first user terminal 21 such that stickers expressed as overaction can be preferentially exposed among the sticker group selected in consideration of the dialogue situation, the relation with the other party, and the emotional state.

Figure 4:
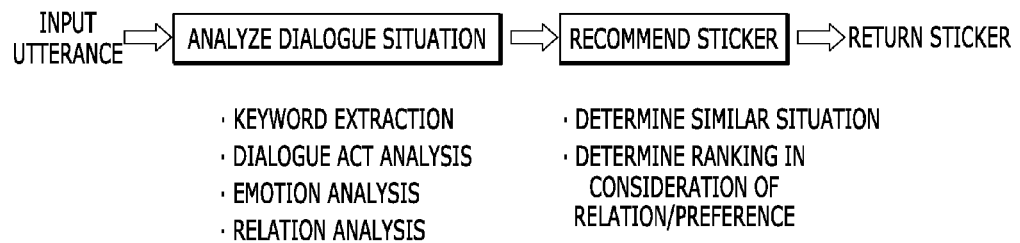
FIG. 4 is a view illustrating a process of recommending stickers by analyzing collected utterances.

As shown in FIG. 4, these series of sticker recommendation processes may be roughly divided into a dialogue situation analysis process and a sticker recommendation process.

FIG. 4 is a view illustrating a process of recommending stickers by analyzing collected utterances.

In the dialogue situation analysis process, through natural language processing, colloquial style of sentences may be corrected, and morphemes may be analyzed. Also, parts of speech may be attached.

As a result, the surface factors in regard to unit utterance may be extracted.

After the surface factors in regard to utterance are analyzed, dialogue act analysis and emotion analysis may be performed using the analysis result of the surface factors.

Also, the relationship between dialogue parties may be analyzed through the analysis on pairs of dialogues that are exchanged.

Meanwhile, the server 10 may search for the most similar dialogue situation using a separate dialogue situation classification system.

The dialogue situation may be roughly divided in accordance with intention/emotion/relation, which are overall considered.

"Intention" may be classified into various types from the general-purpose or social formality viewpoint of dialogue. For example, the intention may be classified into "praise", "help request", "greeting", and "boast".

"Emotion" may be divided into various categories according to the degree of emotion. For example, the emotion may be classified into categories such as "happiness" and "sadness", and may be divided in accordance with the degree of emotion such as "very", "normally", and "slightly".

"Relation" may be classified in accordance with the relationship between subordinates and superiors and the degree of intimacy. For example, the relation may be classified into "superior", "subordinate", "familiarity", and "unfamiliarity".

When the dialogue situation is analyzed through the foregoing process, the server 10 may recommend stickers by a sticker recommendation algorithm in the sticker recommendation process.

Hereinafter, these series of processes will be described in detail with reference to the accompanying drawings.

First, in the dialogue situation analysis process, the server 10 may not analyze only a single utterance, but also may analyze the flow of two-way dialogue between dialogue parties.

The dialogue situation analysis process may be further divided into an utterance unit analysis process and a dialogue unit analysis process.

In the utterance analysis process, the analysis of vocabulary level may be performed regardless of the context.

In the utterance analysis process, colloquial style of sentences may be first corrected. In the correction of the colloquial style of sentences, word spacing, misspelling and slang may be corrected. Emoticons may be recognized to be converted into vocabularies corresponding thereto.

Meanwhile, morpheme analysis and attachment of parts of speech may be performed, and thus keywords may be extracted.

Thereafter, in the dialogue unit analysis process, dialogue act analysis, emotion analysis, and relation analysis may be performed. Thus, the server 10 may generate dialogue situation information.

In the dialogue unit analysis process, the analysis may be performed in consideration of the two-way dialogue context, not the utterance unit, and the situation classification system that is already constructed during the dialogue unit analysis may be used.

Figure 5A:
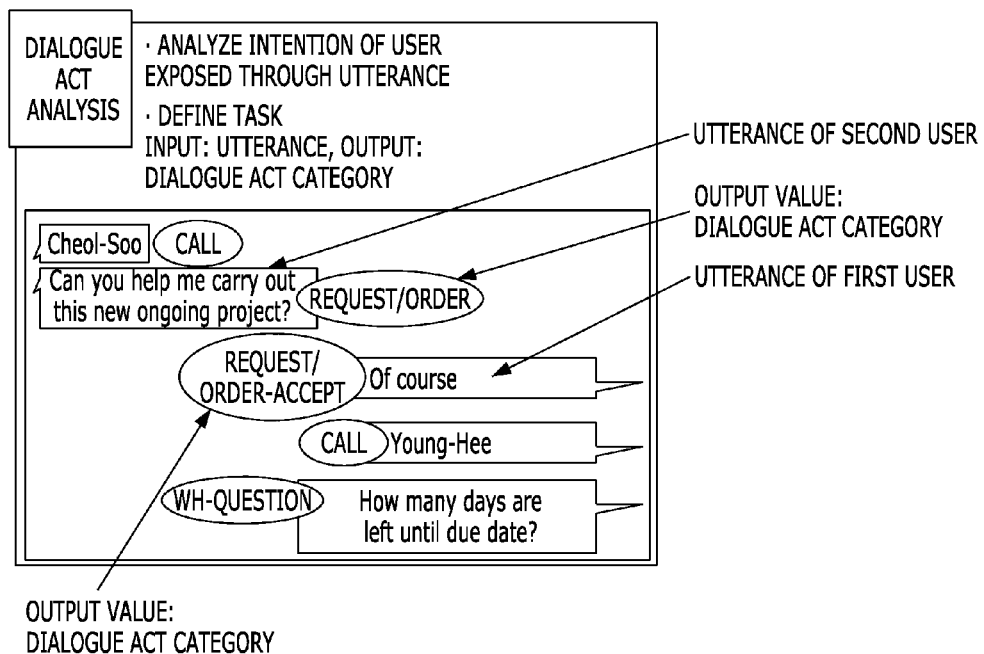
FIG. 5A to 5C are views illustrating dialogue act analysis, emotion analysis, and relation analysis, respectively.
Figure 5B:
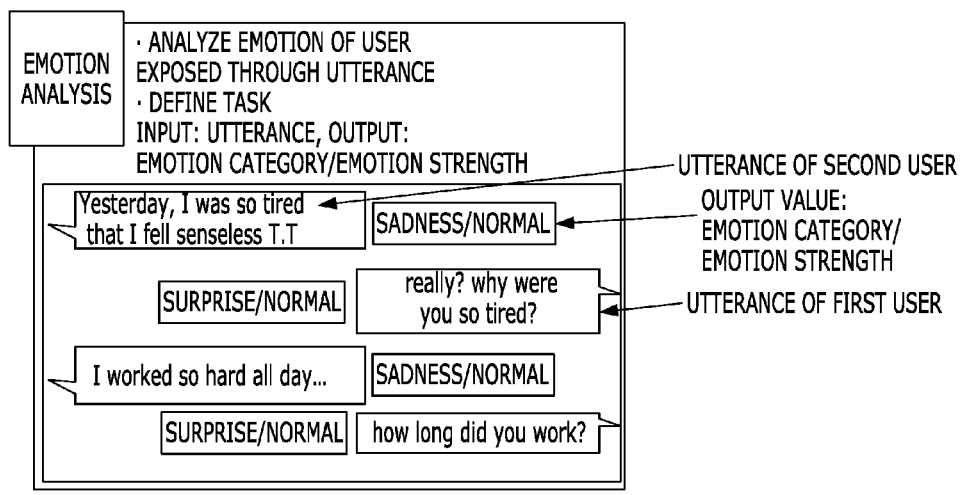
Figure 5C:
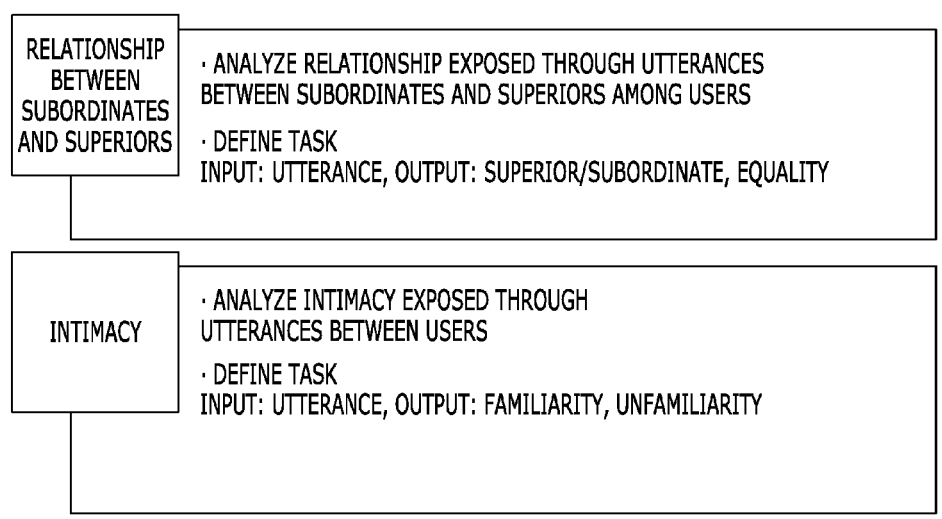

FIG. 5A to 5C are views illustrating dialogue act analysis, emotion analysis, and relation analysis, respectively.

As shown in FIG. 5A, the intention of a user, exposed through utterances, may be analyzed in the dialogue act analysis process.

The input value may be "utterance", and the output value may be "dialogue act category".

In FIG. 5A, when the first user inputs an utterance "Can you help me carry out this new ongoing project?", it can be seen that the output value corresponding thereto is "request/order" that is one of predefined dialogue act categories.

As shown in FIG. 5B, the emotion of a user, exposed through utterances, may be analyzed in the emotion analysis process.

The input value may be "utterance", and the output value may be "emotion category and emotion degree".

In FIG. 5B, when the first user inputs an utterance "Yesterday, I was so tired that I fell senseless. TT", it can be seen that the output value corresponding thereto is "sadness" and "normal". That is, the emotion category may be analyzed as "sadness", and the emotion degree may be analyzed as "normal".

As shown in FIG. 5C, the relationship between subordinates and superiors and the intimacy between users, which are exposed through utterances, may be analyzed in the relation analysis process.

The input value may be "utterance", and the output value of the analysis result on the relationship between subordinates and superiors may be "subordinates and superiors" or "equality". The output value of the analysis result on the intimacy may be "familiarity" or "unfamiliarity".

Thus, when the dialogue situation information is generated through the dialogue act analysis, the emotion analysis and the relation analysis, the server 10 may retrieve similar situation using the situation classification system.

The dialogue situation classification system may be divided into a dialogue act classification system and an emotion classification system.

The dialogue act classification system may be obtained by classifying the dialogue act, i.e., intention of dialogue into various types from the general-purpose or social formality viewpoint of dialogue.

Figure 6:
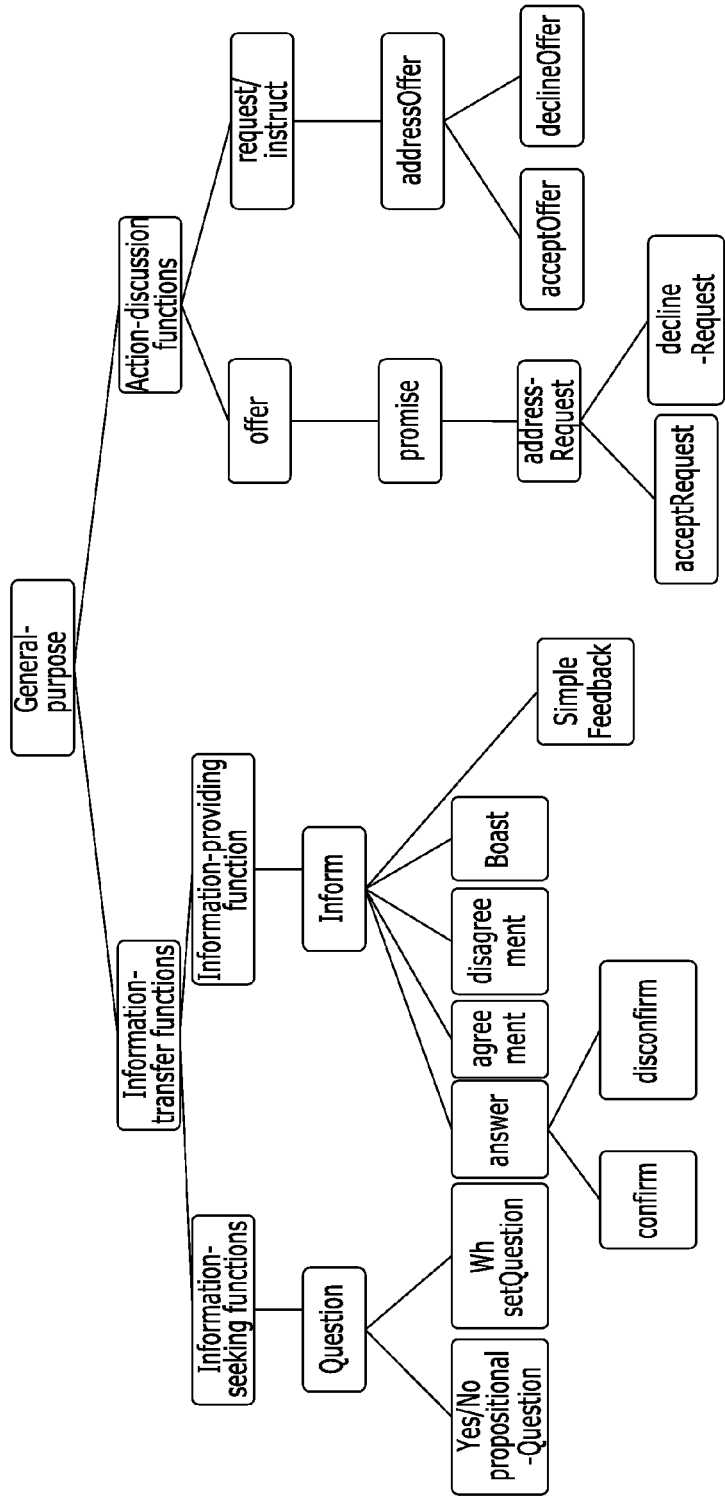
FIG. 6 is a view illustrating a classification system of dialogue acts from the general-purpose viewpoint of dialogue.

FIG. 6 is a view illustrating a classification system of dialogue acts from the general-purpose viewpoint of dialogue.

As shown in FIG. 6, the types such as "Yes-No question", "Wh-question", "Answer-confirm", "Answer-disconfirm", "Agreement", "Disagreement", and "Boast" may be shown.

In FIG. 6, the dialogue act classification system may reflect the hierarchical structure and the classification standards of ISO standard classification system, and may be established so as to comply with Korean language dialogue intention classification. The classification corresponding to emotion may be removed from the dialogue act classification system.

Figure 7:
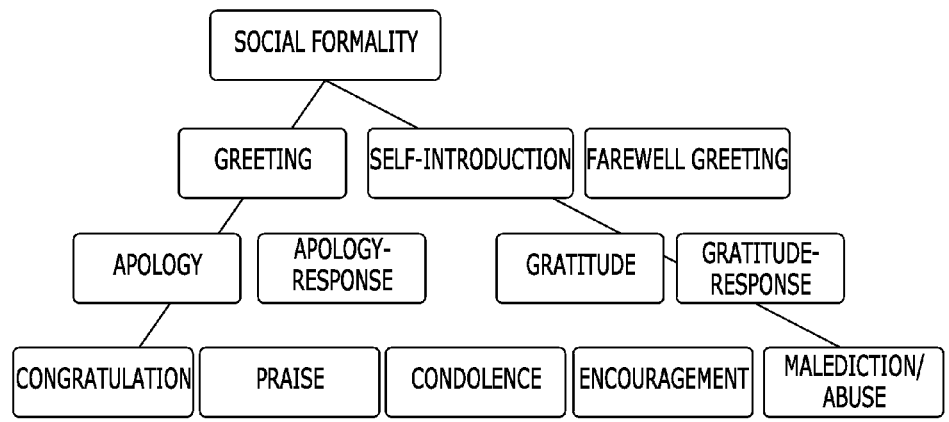
FIG. 7 is a view illustrating a classification system of dialogue acts from the viewpoint of social formality.

The dialogue act classification system of FIG. 7 may be a separate classification system obtained by considering factors of the dialogue attitudes frequently emerging in a messenger service, in addition to the dialogue general-purpose classification system of FIG. 6.

In FIG. 7, the factors of the dialogue attitudes may include "greeting", "apology", "gratitude", "congratulation", "condolence", "encouragement", and "malediction".

The dialogue act classification system of FIG. 7 may correspond to a classification system of modalities of dialogue.

Figure 8:
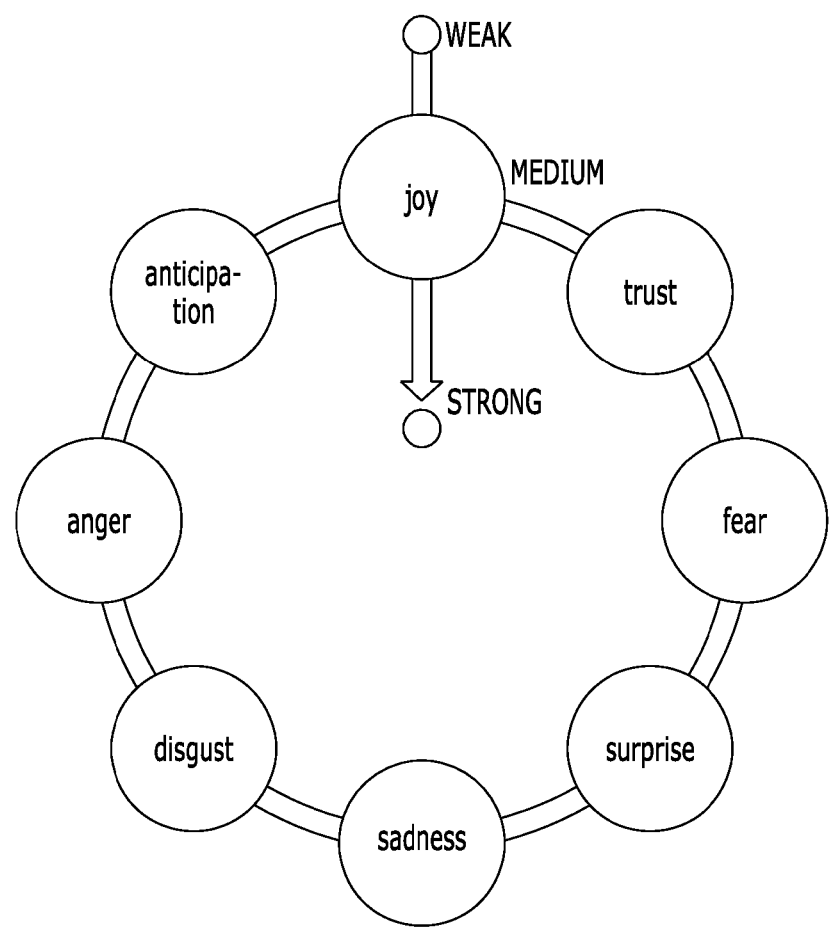
FIG. 8 is a view illustrating a classification system of emotion according to type and degree.

FIG. 8 is a view illustrating a classification system of emotion according to type and degree.

The emotion classification system of FIG. 8 may be obtained by referring to well-known emotion classification models, and may be divided into nine emotion categories including "neutral emotion", i.e., emotionless state.

Here, each emotion category may be divided into strong, medium, and weak in accordance with the emotion degree.

Next, in the sticker recommendation process, the server 10 may retrieve a similar situation by applying the generated dialogue situation information to the dialogue act classification system and the emotion classification system.

As shown in FIG. 4, the sticker recommendation process may include a similar situation search process and a relationship and preference-based ranking determination process.

In the similar situation search process, the most similar situation may be selected from utterance data that are already analyzed and stored based on the most probable dialogue act flow using the dialogue situation information.

Also, it may be determined whether an utterance starts a theme or corresponds to a response.

Each situation may be beforehand matched with sticker candidate groups according to whether an utterance starts a theme or corresponds to a response. In the preference-based ranking determination process, the ranking of the matched sticker candidate groups may be determined.

Appropriate stickers may be preferentially exposed according to the suitability based on the relationship with the other party and the suitability based on the preference of a user.

The sticker recommendation as illustrated in FIG. 3 may be achieved through these series of processes.

The method of recommending stickers through dialogue act analysis according to the embodiment of the present invention may provide a more detailed process of acquiring dialogue context factors using the analysis result on a plurality of continuous utterances while performing the surface analysis on the utterance and determining the dialogue act categories during the series of processes described above.

Hereinafter, the method of recommending stickers through dialogue act analysis according to the embodiment of the present invention will be described in detail with reference to FIGS. 9 to 16.

Figure 9:
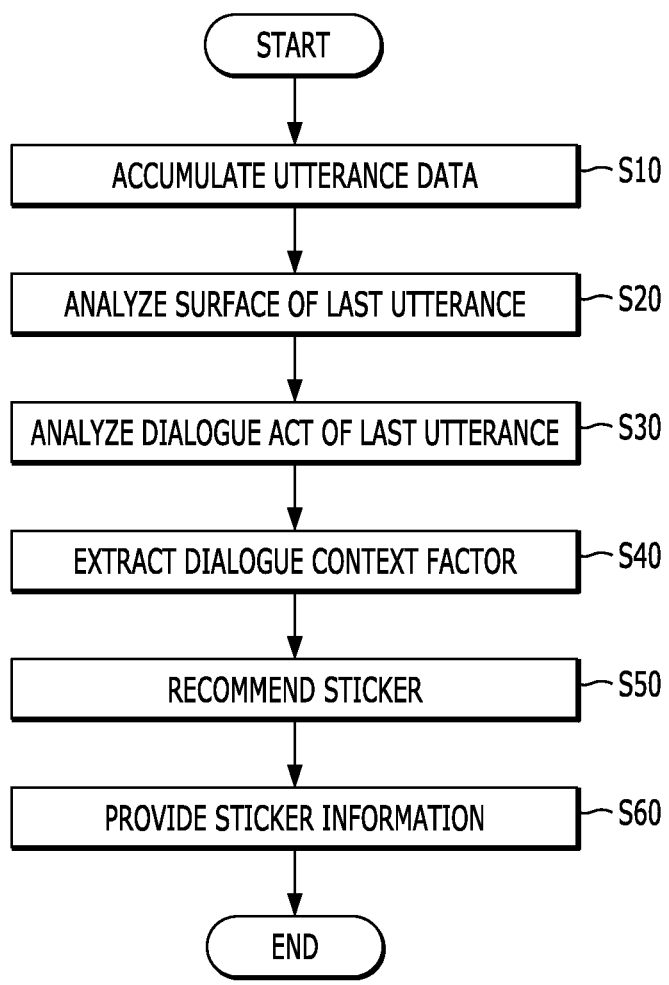
FIG. 9 is a flowchart illustrating a method of recommending stickers through dialogue act analysis described in time-series according to an embodiment of the present invention.

FIG. 9 is a flowchart illustrating a method of recommending stickers through dialogue act analysis described in time-series according to an embodiment of the present invention.

As shown in FIG. 9, the server 10 may accumulate utterance data through dialogue act and emotion tag attachment to corpuses (S10).

Figure 10:
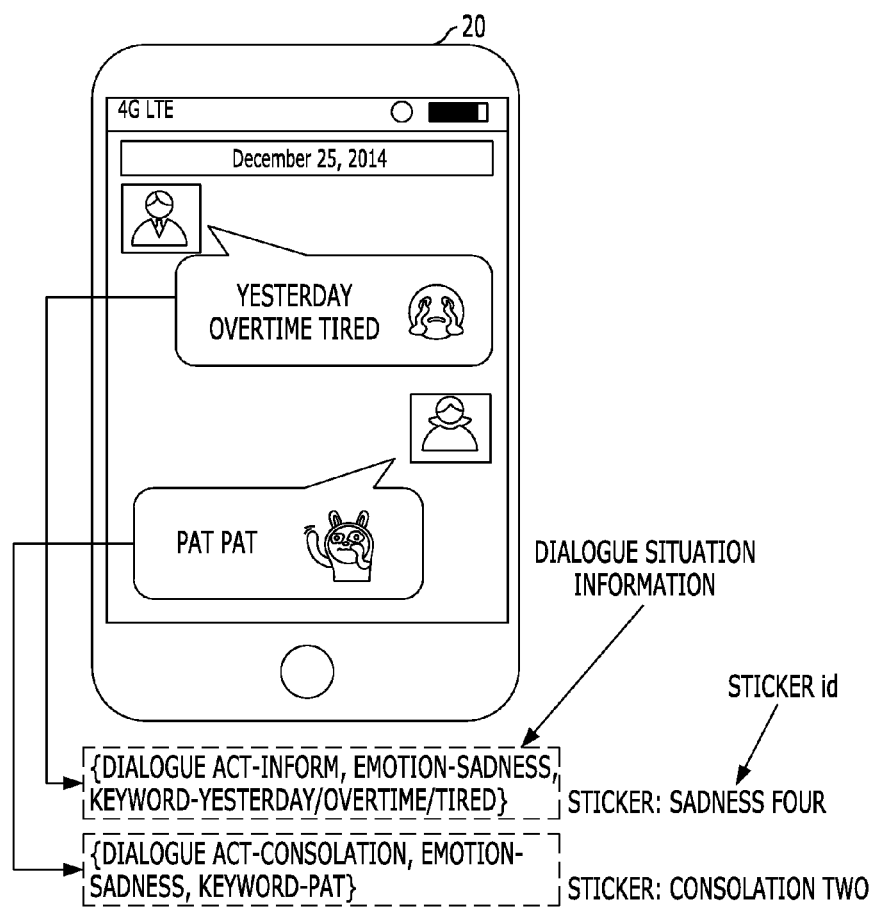
FIG. 10 is a view illustrating a process of generating a dialogue situation and sticker information combination from corpus.
Figure 11:
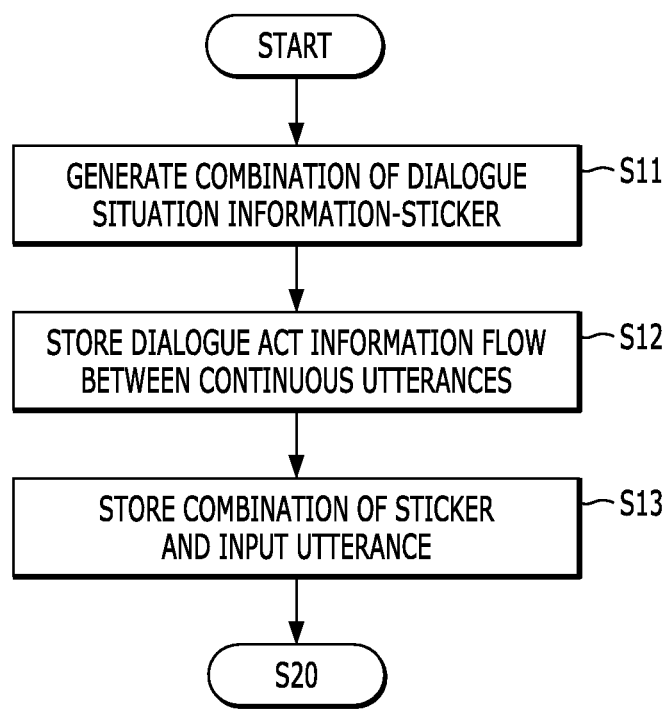
FIG. 11 is a flowchart illustrating a process of accumulating utterance data through corpus machine learning.

FIGS. 10 and 11 illustrate a process of performing machine learning from corpus to generate dialogue situation information and indexing for similarity determination of stickers of utterances.

Operation S10 may be described in detail as shown in FIG. 11. First, the server 10 may generate dialogue situation information from utterances to which stickers are attached, and may generate a combination of dialogue situation information and sticker (S11).

As illustrated in FIG. 10, a process of attaching dialogue act/emotion/keyword tags through the analysis about corpuses and generating the dialogue situation information can be shown.

The utterance expressed at the upper end of FIG. 10 is "I'm so tired because I worked overtime yesterday (sticker)". The dialogue situation information obtained from the analysis result on the utterance may include "{dialogue act-inform, emotion-sadness, and keywords-yesterday/overtime/tired}". Also, the corresponding utterance may have a sticker ID, "sadness 4" attached thereto.

Accordingly, a combination of dialogue situation information and sticker like "{dialogue act-inform, emotion-sadness, and keywords—yesterday/overtime/tired} sticker: sadness 4" may be generated.

Thereafter, the server 10 may index and store the flow of dialogue act information between continuous utterances (S12).

In FIG. 10, the dialogue act information of the upper utterance is "inform", and the dialogue act information of the next utterance is "consolation". Accordingly, the flow of dialogue act information may be stored as "inform-consolation".

Various combinations of dialogue act information flow may be stored as a result of learning a large number of corpuses.

Next, a combination of a sticker and an input utterance may be indexed into a sticker ID to be stored (S13).

Through learning about corpuses, the attachment relationship between stickers and utterances may be indexed and stored by sticker ID. Thus, the correlation and similarity between utterances and stickers can be numerically calculated using dialogue act information and keywords of utterances.

Thus, the learning to corpuses and the construction of utterance data may be completed.

Thereafter, the server 10 may collect and analyze utterances between the first user terminal 21 and the second user terminal 22. When there is a new utterance, the server 10 may first perform surface analysis on the present utterance, i.e., the last utterance (S20).

Figure 12:
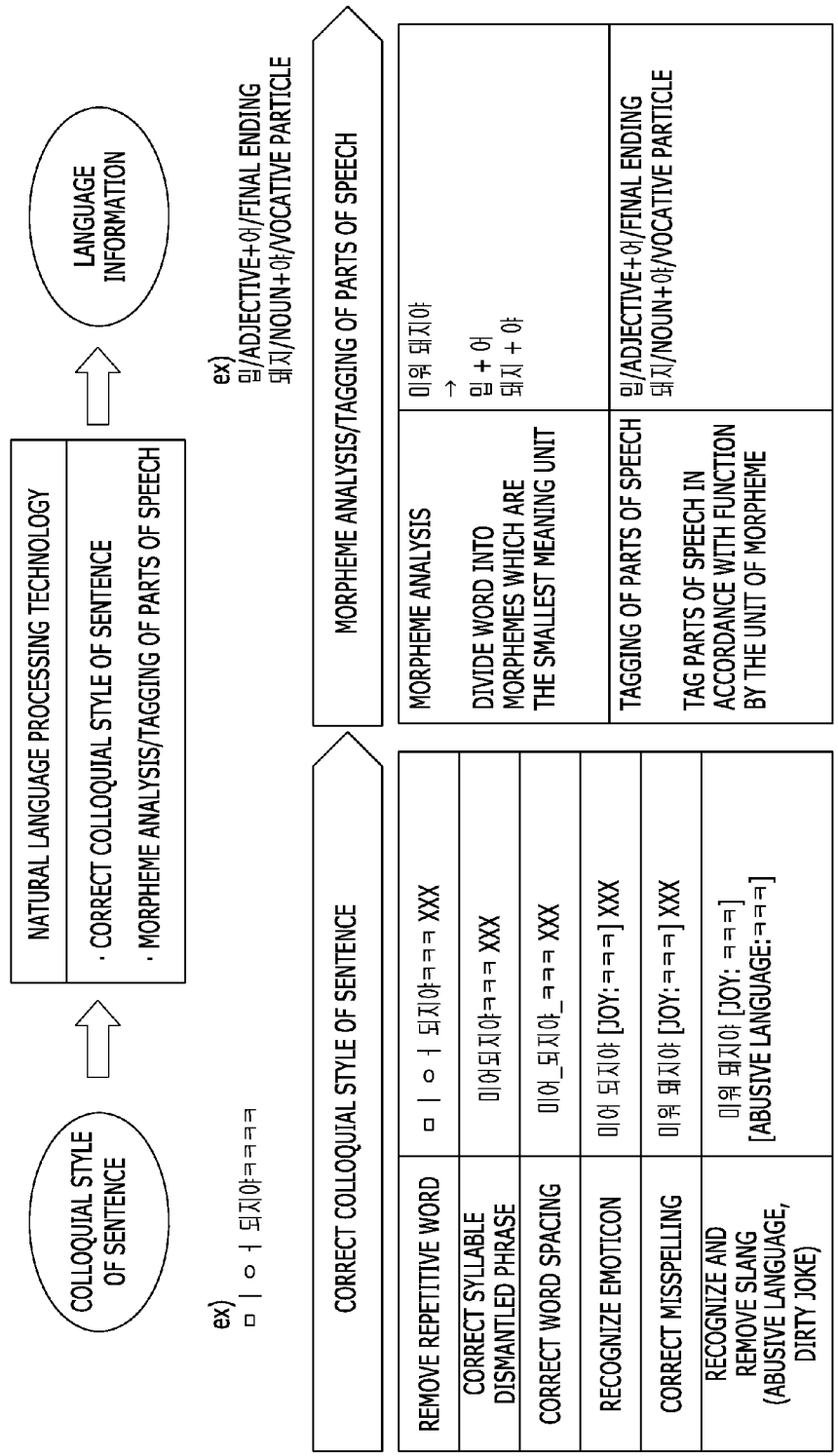
FIG. 12 is a view illustrating a method of processing natural language utterance analysis.
Figure 13:
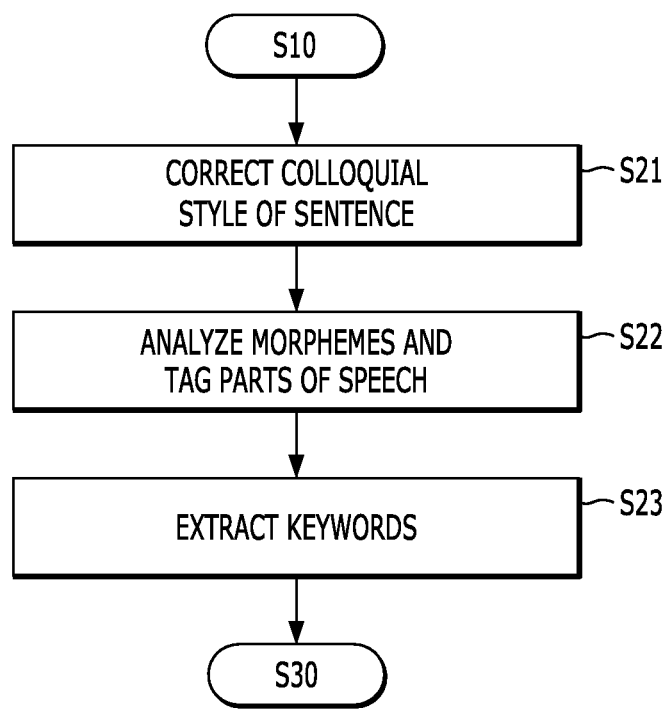
FIG. 13 is a view illustrating a natural language utterance analysis process.

FIGS. 12 and 13 further illustrate a surface analysis process of each utterance through natural language utterance analysis by the server 10.

As shown in FIG. 13, in the surface analysis process, the server 10 may correct colloquial style of sentences in regard to utterances that are inputted (S21).

As illustrating in FIG. 12, an inputted utterance is ㄲ ㅣ ㅇ, ㅓ돼지야ㅋㅋㅋㅋ

1) The repetitive word ㅋ ㅋ ㅋ ㅋ may be shortened to ㅋ ㅋ ㅋ,

2) The syllable dismantled phrase may be corrected from ㅁ ㅣ ㅇ ㅓ to 미어,

3) The word spacing may be corrected from 미어되지야 to 미어, 되지야

4) The emoticon may be recognized, and thus ㅋ ㅋ ㅋ may be converted into "[joy: ㅋ ㅋ ㅋ]", and 5) The misspelling may be corrected from 돼지 to 돼지.

Also, when slang or abusive language exists in an inputted utterance, slang or abusive language may be removed.

If the colloquial style of sentence is corrected through the foregoing processes, then the server 10 may analyze morphemes in regard to the corrected utterance and attach parts of speech (S22).

As illustrated in FIG. 12, a word may be divided into morphemes, and thus the corrected sentence 미워 돼지야 may be divided into 밉+어 and 돼지+야.

Thereafter, the parts of speech may be tagged in accordance with the function by the unit of morpheme.

In this example, the pars of speech may be attached like "밉/adjective+ +어/final ending", "돼지/noun+야/vocative particle".

Thus, when the tagging of the parts of speech is completed, keywords may be extracted (S23). Keywords may be extracted mainly based on substantives.

Besides, in the surface analysis process, the surface factors that are variously defined in regard to utterance may be extracted.

FIG. 14 is a view illustrating surface factors.

Basic morphemes, pairs of words and parts of speech, subjects, length, the last word, verbs, adverbs, auxiliary predicates, formal morphemes or parts of speech may be checked, and factors about abusive language or emoticon are extracted.

When the surface analysis on the last utterance is completed through the foregoing process, the server 10 may perform dialogue act analysis on the last utterance using the surface analysis result (S30).

In the dialogue act analysis process, it may be determined which dialogue act category the corresponding utterance belongs to in an already-established dialogue act classification system using surface factors surface factor.

The dialogue act category to which the utterance belongs may be determined using the combination of surface factors.

As an analysis result, any one value of dialogue act categories as shown in FIGS. 6 and 7 may be returned.

Meanwhile, when the surface analysis and the dialogue act analysis about the last utterance are completed, the keywords and dialogue act category of the last utterance can be obtained.

The server 10 may generate a dialogue context factor including the surface analysis and dialogue act analysis results on the previous utterances of the last utterance (S40).

FIG. 15 is a view illustrating dialogue context factors.

Instead of recommending stickers with a single utterance, the surface analysis and dialogue act analysis results on several previous utterances of the last utterance need to be considered in order to define and describe the context of dialogue.

Particularly, in addition to the utterances of one user, the utterances of the other party need to be also considered.

The dialogue context factor illustrated in FIG. 15 may include the surface factors, the dialogue act categories, the types and degrees of emotions of several previous utterances.

Thus, as the dialogue context factors are generated, the server 10 may select stickers to be recommended to the first user using the generated dialogue context factors (S50).

Stickers associated with utterance data matching with changes of dialogue act categories included in the dialogue context factor and matching with the keywords of the last utterance among the utterance data that are already accumulated may be selected.

When stickers are associated with utterances matching with the change of the dialogue act categories of the last several utterances between the first user and the second user among the utterance data, and simultaneously, match with the keywords obtained from the surface analysis on the last utterance (e.g., stickers used critical number or more times in the utterance in which the corresponding keywords are to be included as a result of sticker ID indexing, or stickers having the corresponding keywords as metadata), the stickers may be considered to be appropriate for contextual attachment to the utterance of the first user or answer to the utterance of the second user.

Thus, when stickers to be recommended are selected, the server 10 may provide information (e.g., sticker ID or sticker graphic data) on the selected stickers for the first user terminal 21 (S60)

Figure 16:
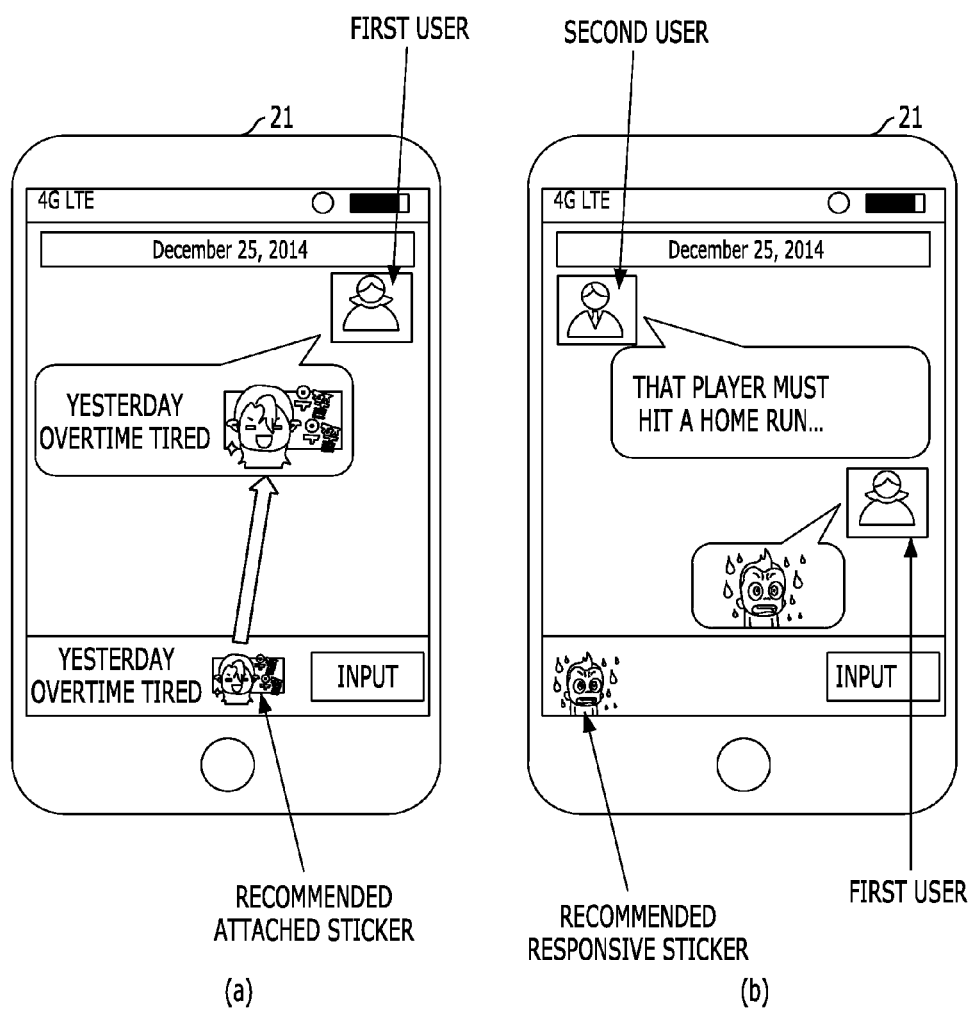
FIG. 16 is a view illustrating stickers recommended to users.

FIG. 16 illustrates stickers recommended to the first user terminal 21 through the foregoing processes.

FIG. 16A illustrates the recommendation of an attached sticker. A sticker that is worthy of attachment to the corresponding utterance for the first user may be recommended through the analysis on texts (last utterance) inputted by the first user. Naturally, the context may be considered including previous utterances of the corresponding utterance.

FIG. 16B illustrates the recommendation of a response sticker. The last utterance is an utterance of the second user, "That player must hit a home run . . . ". In this case, a sticker that is worthy of use in response to the last utterance for the first user may be recommended through the analysis on the last utterance of the second user.

Hereinafter, the configuration of the sticker recommendation system through dialogue act analysis according to the embodiment of the present invention will be described in detail with reference to FIG. 17.

Figure 17:
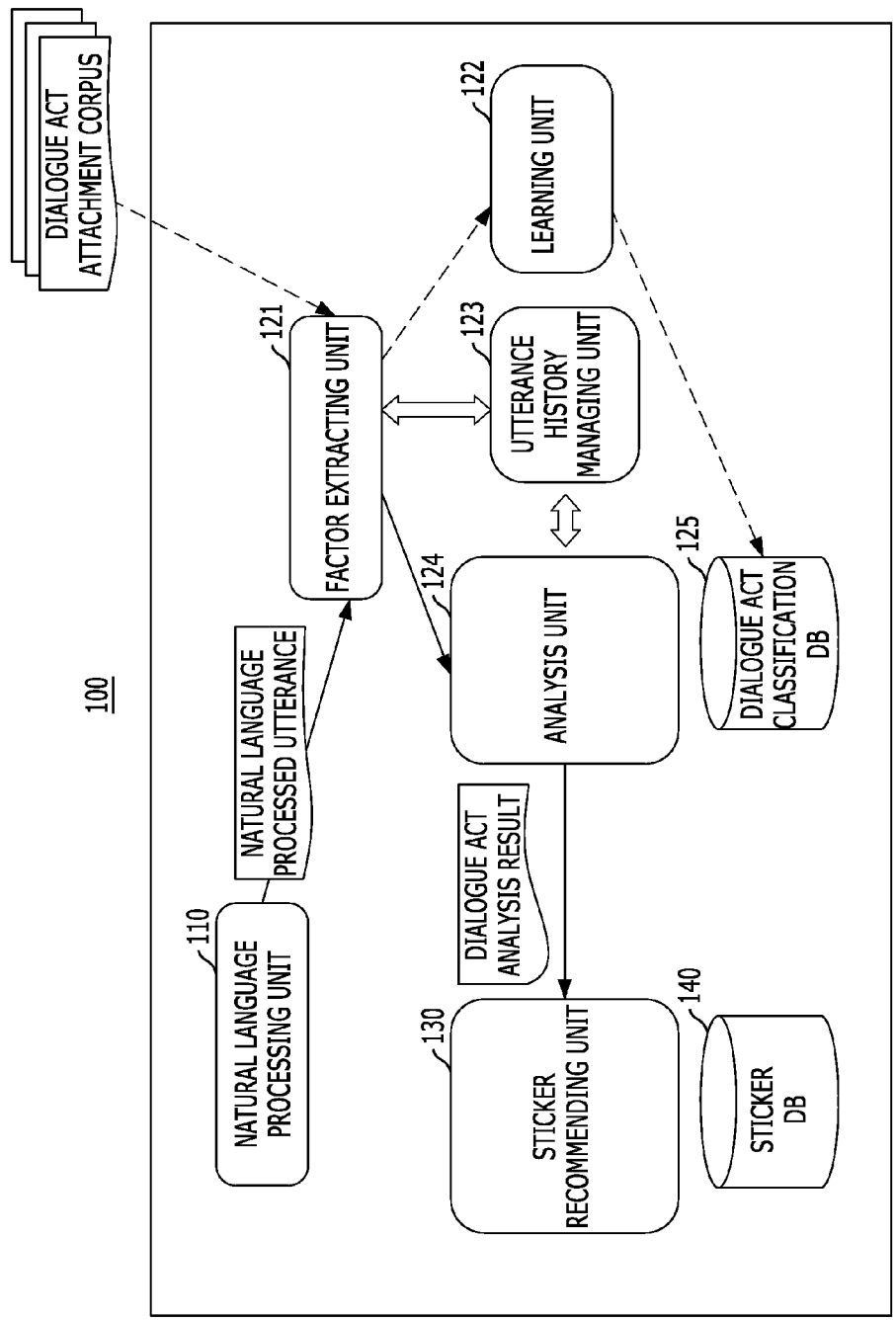
FIG. 17 is a block diagram illustrating the structure of a sticker recommendation system through dialogue act analysis.

FIG. 17 is a block diagram illustrating the structure of a sticker recommendation system through dialogue act analysis.

A sticker recommendation system shown in FIG. 17 may be implemented in a form of a server 10. A portion of components may be a form of computer program loaded and executed in the server 10, and another portion of components may be a portion of hardware resources forming the server 10.

As shown in FIG. 17, the sticker recommendation system 100 may include a natural language processing unit 110, a factor extracting unit 121, a learning unit 122, an utterance history managing unit 123, an analysis unit 124, a dialogue act classification database 125, a sticker recommending unit 130, and a sticker database 140.

The natural language process unit 110 may process surface analysis on collected utterances.

The analysis unit 124 may perform dialogue act analysis on the utterances, and may extract dialogue context factors.

The dialogue act classification database 125 may store utterance data that are constructed through learning to corpuses and dialogue act classification system.

The sticker recommending unit 130 may select stickers to be recommended to the first user using the dialogue context factors.

The learning unit 122 may generate utterance data through dialogue act and emotion tag attachment to corpuses, and may store the utterance data in the dialogue act classification database.

For this, the learning unit 122 may generate dialogue situation information from corpuses to which stickers are attached, and may generate a combination of dialogue situation information-sticker. Also, the learning unit 122 may index the flow of dialogue act information between continuous utterances, and may index the combination of sticker and input utterance into a sticker ID to store in the dialogue act classification database 125.

The utterance history managing unit 123 may manage and store the relationship between a plurality of continuous utterances. When utterances of two or more users are separated and analyzed for each user, the context flow cannot be accurately understood. Accordingly, the precedence relation and connection relation of continuous utterances exchanged between users in dialogue need to be managed.

The sticker database 140 may store a plurality of stickers. Each sticker may have metadata.

The method according to the embodiment of the present invention can also be embodied into a form of program instruction executable through various computer means, and can be recorded on computer readable media. The computer readable media may include program instructions, data files, data structures, or combinations thereof. The program instructions recorded in the media may be what is specially designed and constructed for the present invention, or may be what is well-known to computer software engineers skilled in the art. Examples of computer readable recording media include hard disk, magnetic media such as floppy disks and magnetic tapes, optical media such as CD-ROM and DVD, magneto-optical media such as floptical disk, and hardware devices such as ROM, RAM, and flash memory, which are specially configured so as to store and perform program instructions. Examples of program instructions may include high-level language codes which can be executed by computers using an interpreter and the like, as well as machine language codes which are made by a compiler.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

According to the embodiments, although an identical dialogue content or keyword is inputted, an identical sticker is not necessarily recommended, but an appropriate sticker can be recommended in consideration of the dialogue situation and context. That is, compared to well-known algorithms of automatically recommending a sticker through simple keyword matching, the appropriacy of sticker recommendation can be secured by considering the dialogue situation or context.

Particularly, a sticker matching with a context can be recommended by generating dialogue situation information and thus recommending the sticker by analyzing dialogue acts by the unit of dialogue (including a plurality of utterances that sequentially continue), not by the unit of utterance.

The present invention can be applied to social network service and messenger technical fields.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of recommending a sticker group by use of a server that is connected to a database, a first user terminal and a second user terminal through a network and relays an utterance inputted to a messenger between the first user terminal and the second user terminal, the utterance including at least one of a text and an image, the method comprising:
   analyzing utterances to generate utterance data and storing the utterance data in the database, the utterance data comprising multiple combinations that each include dialogue situation information and a sticker;
   analyzing a set of utterances between the first user terminal and the second user terminal to determine a dialogue situation between the first and second user terminals, the set of utterances including at least one utterance from the first user terminal and at least one utterance from the second user terminal;
   retrieving, from the utterance data, one or more of the combinations that each have a similar dialogue situation to the dialogue situation between the first and second user terminals;
   generating a sticker group that includes one or more stickers of the retrieved one or more combinations:
   analyzing metadata of stickers that are used by a first user of the first terminal to determine a type of expression that the first user mainly represents by the stickers;
   correcting the sticker group such that a sticker associated with the determined type of expression is most preferentially exposed to the first user among the sticker group; and
   recommending the selected corrected sticker group to the first user terminal to be displayed to the first user.

2. A non-transitory computer readable medium storing one or more sequences of pattern data for recommending a sticker group by use of a server that is connected to a database, a first user terminal and a second user terminal through a network and relays an utterance inputted to a messenger between the first user terminal and the second user terminal, the utterance including at least one of a text and an image, wherein execution of the one or more sequences of the pattern data by one or more processors causes the one or more processors to perform the steps of:

analyzing utterances to generate utterance data and storing the utterance data in the database, the utterance data comprising multiple combinations that each include dialogue situation information and a sticker;

analyzing a set of utterances between the first user terminal and the second user terminal to determine a dialogue situation between the first and second user terminals, the set of utterances including at least one utterance from the first user terminal and at least one utterance from the second user terminal;

retrieving, from the utterance data, one or more of the combinations that each have a similar dialogue situation to the dialogue situation between the first and second user terminals;

generating a sticker group that includes one or more stickers of the retrieved one or more combinations;

analyzing metadata of stickers that are used by a first user of the first terminal to determine a type of expression that the first user mainly represents by the stickers;

correcting the sticker group such that a sticker associated with the determined type of expression is most preferentially exposed to the first user among the sticker group; and recommending the selected corrected sticker group to the first user terminal to be displayed to the first user.

3. The method of claim 1, wherein the type of expression is overaction.

4. The non-transitory computer recording medium of claim 2, wherein the type of expression is overaction.

\* \* \* \* \*